(12) United States Patent
Reichelt et al.

(10) Patent No.: US 8,276,521 B2
(45) Date of Patent: Oct. 2, 2012

(54) GAS GENERATOR FOR AN AIRBAG MODULE

(75) Inventors: Silvio Reichelt, Grimma (DE); Jiang Zhang, Siegen (DE); Vladimir Dolzhanskiy, Aschaffenburg (DE); Gerrit Von Breitenbach, Karlstein (DE); Heiko Kratz, Kronberg (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 12/659,933

(22) Filed: Mar. 25, 2010

(65) Prior Publication Data

US 2010/0186616 A1 Jul. 29, 2010

Related U.S. Application Data (63) Continuation of application No. PCT/EP2008/062225, filed on Sep. 15, 2008.

(30) Foreign Application Priority Data

Oct. 5, 2007 (DE) .......................... 10 2007 048 735
Dec. 12, 2007 (DE) .......................... 10 2007 060 451
Apr. 16, 2008 (DE) .......................... 10 2008 019 863

(51) Int. Cl.
*B60R 21/26* (2011.01)

(52) U.S. Cl. .................... 102/530; 280/741; 280/736

(58) Field of Classification Search .................. 102/530, 102/531; 280/741, 736
See application file for complete search history.

(56) References Cited

U.S. PATENT DOCUMENTS

| 3,986,456 | A | 10/1976 | Doin et al. |
| 5,100,174 | A | 3/1992 | Jasken et al. |
| 5,951,040 | A | 9/1999 | McFarland et al. |
| 6,068,294 | A | 5/2000 | Jordan |
| 6,213,501 | B1 | 4/2001 | Hock |
| 6,227,565 | B1 | 5/2001 | McFarland et al. |
| 6,290,256 | B1 | 9/2001 | McFarland et al. |
| 6,315,322 | B1 | 11/2001 | Mika |
| 6,364,353 | B2 * | 4/2002 | Green et al. .................. 280/736 |

(Continued)

FOREIGN PATENT DOCUMENTS

DE 25 18 460 10/1975

(Continued)

OTHER PUBLICATIONS

Office Action in DE Appln No. 10 2008 019 863.3-21 dated Feb. 4, 2011.

*Primary Examiner* — James Bergin
(74) *Attorney, Agent, or Firm* — Foley & Lardner LLP (57) ABSTRACT

The invention relates to a gas generator for an airbag module having a gas generator housing, in which a first chamber for receiving a propellant for igniting a main gas set in a second chamber, and an ignition device for the ignition of the propellant are provided. In order to simplify the production of the gas generator, the invention provides that the first chamber for receiving the propellant is limited by a pipe, on the first end of which the ignition device is disposed, and the second end of which reaches the gas generator housing at least approximately. The first and the second chamber are separated from each other such that no parts of the propellant may reach the second chamber via the second end of the pipe before the ignition of the propellant.

19 Claims, 8 Drawing Sheets

U.S. PATENT DOCUMENTS

| | | |
|---|---|---|
| 2001/0001523 A1 | 5/2001 | Green, Jr. et al. |
| 2002/0005636 A1 | 1/2002 | McFarland et al. |
| 2004/0124618 A1 | 7/2004 | Schonhuber et al. |
| 2005/0161924 A1 | 7/2005 | Schoenhuber et al. |
| 2006/0119087 A1* | 6/2006 | Blessing et al. ............... 280/736 |
| 2006/0137786 A1* | 6/2006 | Yamazaki et al. ............... 149/22 |
| 2006/0254454 A1 | 11/2006 | Bierwirth |
| 2008/0022880 A1 | 1/2008 | Bierwirth et al. |
| 2008/0122207 A1 | 5/2008 | Domazet et al. |
| 2008/0136152 A1 | 6/2008 | McFarland |

FOREIGN PATENT DOCUMENTS

| | | |
|---|---|---|
| DE | 91 17 104 U1 | 4/1996 |
| DE | 195 31 666 A1 | 3/1997 |
| DE | 198 12 221 A1 | 9/1998 |
| DE | 199 23 931 A1 | 12/1999 |
| DE | 100 06 522 A1 | 9/2000 |
| DE | 100 02 799 A1 | 1/2001 |
| DE | 202 19 899 U1 | 7/2003 |
| DE | 20 2004 001 018 U1 | 7/2004 |
| DE | 603 07 236 T2 | 10/2007 |
| DE | 10 2006 035 584 A1 | 2/2008 |
| DE | 1020070 54 344 A1 | 6/2008 |
| DE | 10 2007 056 602 A1 | 7/2008 |
| EP | 0 754 605 A2 | 1/1997 |
| EP | 0 926 015 A2 | 6/1999 |
| EP | 1 433 671 A1 | 6/2004 |
| EP | 1 721 789 A1 | 11/2006 |
| WO | WO 94/25315 A1 | 11/1994 |
| WO | WO 97/08018 A2 | 3/1997 |
| WO | WO 03/072394 A2 | 9/2003 |
| WO | WO 2009/047086 * | 4/2009 |

* cited by examiner

GAS GENERATOR FOR AN AIRBAG MODULE

CROSS-REFERENCE TO RELATED PATENT APPLICATIONS

This application is a Continuation of International Application PCT/EP2008/062225, filed Sep. 15, 2008, which was published in German on Apr. 16, 2009, as WO 2009/047086A1. The foregoing International Application is incorporated herein by reference in its entirety.

BACKGROUND

The invention relates to a gas generator for an airbag module.

For the activation of airbags gas generators are known which have a propellant with an ignition device in a gas generator housing. The propellant is arranged in a chamber. Outside of this chamber a main gas load is provided in the gas generator housing. In case of a crash the propellant is ignited at first which in turn ignites the main gas load which generates the gas flowing into the airbag.

The chamber for the propellant is formed by a cup-shaped sleeve in known gas generator as for instance disclosed in DE 198 12 221 A1. The sleeve is fixed to an ignition device with its open end and the closed end extends into the area of the gas generator housing. The sleeve has lateral breaches which are closed by a film before ignition of the propellant. After ignition of the propellant by the ignition device the film is destroyed by the hot gases of the propellant. The hot gases enter through the breaches into the room with the main gas load and ignite the same whereby the gases flowing into the airbag are generated.

The propellant is mostly present in form of pellets and the main gas load is present in form of tablets. By using a cup-shaped sleeve for the reception of the propellant an elaborate production process is required. Here, at first the pellets of the propellant has to be filled into the cup. Subsequently, the lower part of the gas generator housing with the ignition device has to be fitted onto the cup and has to be connected to the same. Afterwards the lower part has to be rotated around 180° so that the tablets can be filled in.

In order to guarantee good self-ignition properties of the gas generator for instance in case of a vehicle fire it is necessary to burn the main gas load in a controlled manner before its properties are negatively changed by a strong heat reaction. In order to guarantee a safe self-ignition a reproducible and good contact of the advanced ignition substance with the housing wall of the gas generator or sufficient stable heat bridges between the advanced ignition substance and the housing are indispensible. This is not always guaranteed when using a cup-shaped sleeve for the propellant since due to the production and assembly tolerances an air gap between the bottom of the sleeve and the generator housing can be present.

SUMMARY

The object of the present invention is to simplify the production of gas generators. Furthermore, the self-ignition properties and therefore the safety of the gas generator shall be improved in order to make the same in particular more unsusceptible towards assembly tolerances.

According to an exemplary embodiment of the invention at a gas generator for an airbag module with a gas generator housing, in which a first chamber for receiving a propellant for igniting a main gas set in a second chamber and an ignition device for the ignition of the propellant are provided, the first chamber for receiving the propellant is limited by a pipe, on the first end of which the ignition device is arranged and the second end of which reaches at the gas generator housing at least approximately, wherein the first and the second chamber are separated from each other such that all parts of the propellant may reach the second chamber via the second end of the pipe before the ignition of the propellant.

In this arrangement the hot gases of the propellant can reach from the first into the second chamber between the second end of the pipe and the gas generator housing.

The advantage of this arrangement is that the production process of the gas generator is simplified using the propellant and the tablets of the main gas set can be filled into the first or second chamber from the same side, e.g. a rotation of the housing after filling the propellant as by using a cup-shaped sleeve as limitation of the first chamber is nor required.

A further advantage is that breaches in the pipe can be omitted since the hot gases generated by ignition of the propellant can flow through the space between the pipe end and the gas generator housing from the first into the second chamber with the main gas set.

The invention can be implemented in different embodiments. The second end of the pipe can rest against the gas generator housing, which is deformable there by the pressure generated after ignition of the propellant in the pipe so that a space between the second pipe end and the gas generator housing is generated. Thereby, small gaps can be present before the ignition of the propellant between the generator housing and the resting second end of the pipe caused by production tolerances. It must be only guaranteed that no parts of the propellant reach the second chamber.

It is furthermore possible that an intermediate space is provided between the gas generator housing and the second end of the pipe which is blocked by a film which is torn open by the pressure in the first chamber after ignition of the propellant.

By using a cup-shaped gas generator as common in case of driver airbags, the pipe extends between the ignition device extending from the bottom of the gas generator into the gas generator and the cap of the gas generator.

It is provided in a second exemplary embodiment that a chamber for arranging a pyrotechnical load is provided, furthermore a housing which at least partially encloses the chamber; a pipe which restricts a section of the chamber; a part movable relatively to the pipe, which restricts the chamber towards the housing; means for exerting a restoring force on the movable part in order to keep it in thermal contact with the housing such that the chamber is in thermal contact with the surrounding of the housing via the movable part and the housing.

The means for exerting a restoring force provide that the chamber and therefore a pyrotechnical load arranged in the same is in good thermal contact with the surrounding of the gas generator housing so that a premature ignition of the pyrotechnical load occurs when the gas generator is exposed to a high temperature, which is for instance generated by an external heat source (for instance a fire close to the gas generator).

By a premature ignition of the pyrotechnical load its controlled burning is in particular achieved and it is thereby prevented that a pressure builds up in the chamber, which causes a fragmentation of the gas generator. Furthermore, due to a premature ignition it is prevented that components (in particular the housing) of the gas generator are weakened in its stability by the high temperature before the pyrotechnical load ignites.

According to an exemplary embodiment of the invention the good thermal contact is achieved by keeping the movable part, which restricts the chamber towards the housing, in good thermal contact to the housing by the means for exerting a restoring force and the appearance of a gap between the movable part and the housing (e.g. an inner surface of the housing) is avoided. In a variant the pyrotechnical load is an advanced ignition load, which serves the ignition of a further pyrotechnical load (the actual gas set for producing a gas which is used for inflating the airbag). Such an advanced ignition load for instance consists of an advanced ignition means, which has a lower self-ignition temperature than the actual pyrotechnical gas set. In another embodiment the advanced ignition load has a (conventional) booster load to which an advanced ignition means is mixed. Due to the good thermal contact between the chamber and the surrounding of the gas generator it is guaranteed that the advanced ignition means of the advanced ignition load ignites fast enough and therefore, a premature ignition is possible and therefore a controlled burning of the actual gas set occurs.

The housing can be for instance formed by an upper part and a lower part, which are connected to each other in particular by welding. Thereby, the lower part is pressed against the upper part before connecting, whereby the case can occur that immediately before connecting the lower part is again pushed away from the upper part by the gas generator parts (for instance elastic filter elements) arranged in the housing, and a gap is formed between the chamber and the housing (lower part or upper part). The formation of a gap during connecting the housing parts is in particular largely prevented by the means for exerting a restoring force.

The means for exerting a restoring force guarantee for instance that the movable part is kept in a position in which it rests against an inner side of the housing. Furthermore, the means for exerting a restoring force on the movable part can be designed such that they preload the movable part against the housing.

In a further exemplary variant of the invention the pipe extends with one end in direction of the inner surface of the housing, e.g. the end faces the inner surface of the housing. Here, the pipe can at least sectionally have a hollow cylindrical form whereby one end of the pipe faces the inner surface of the gas generator housing and is arranged in the area of the inner surface of the housing.

In a further exemplary embodiment of the invention the movable part is formed flange-like, whereby a first section of the movable part extends along an inner circumference of the pipe and a second section covers at least partially the opening which is formed in one end of the pipe. In this variant the movable part forms therefore a cover-like sealing for sealing the first chamber towards the housing.

The second section of the movable part can in particular rest with one side against an inner surface of the housing. The first section projects for instance into the opening of the end of the pipe facing the inner surface of the housing so that a movement of the movable part is carried out through the pipe. Hereby, the movable part is essentially only movable in one direction towards the inner surface of the housing. For instance, the movable part is inserted via the first section into the opening of the pipe such that its movement can essentially occur exclusively along an axis of the pipe.

The means for exerting a restoring force onto the movable part can for instance comprise an elastic element (of rubber or plastic) and/or a spring-like element. The elastic element, which is provided as a means for exerting a restoring force, is in particular temperature resistant up to a temperature, which is above the ignition temperature of the pyrotechnical load arranged in the chamber.

In an exemplary embodiment of the invention the elastic element is arranged between the end of the pipe and the inner surface of the housing, for instance in form of a ring (i.e. O-ring) of an elastic material. In case the movable part is formed flange-like as described above the elastic element can be arranged between the end of the pipe (e.g. between an edge of this end facing the inner surface of the housing) and an overhang of the second section of the movable part. Thereby, the elastic element exerts a restoring force onto the movable part if it is pushed into the direction of the pipe so that the cover-like second section of the movable part remains in thermal contact with the housing inner surface, for instance rests with one surface against it.

Although the elastic element can be shaped in form of a ring, it does not necessarily have a circular cross section, but can also have for instance an oval cross section. Between the elastic element and the flange-like formed part can in particular exist a clearance fit. Examples of materials for forming the elastic element are heat resistant elastomers as for instance FPM or FFPM (according to DIN/ISO 1629).

In a further exemplary improvement of the invention the chamber with the pyrotechnical load presents a first chamber of the gas generator and the pyrotechnical load a first pyrotechnical load (for instance in form of an advanced ignition load), whereby the housing has beside the first chamber a second chamber for receiving a second pyrotechnical load (for instance in form of a main gas set, which can be ignited by hot gas generated by ignition of the advanced ignition set). In this variant an elastic element, which is formed as a means for exerting a restoring force on the part, can simultaneously seal the first chamber against the second chamber, e.g. can in particular before ignition of the first pyrotechnical load prevent an overflowing of gas from the first chamber into the second chamber or vice versa or can at least counteract the overflowing.

In a exemplary further improvement the movable part is designed such that it releases under influence of a gas pressure generated by igniting the pyrotechnical load an outflow opening from which the gas can flow out of the chamber. In particular, in case the gas generator has a first and a second chamber gas can flow via the outflow opening from the first chamber of the gas generator into the second chamber so that the gases generated by the first pyrotechnical load in the first chamber can effect an ignition of the second pyrotechnical load in the second chamber.

It is pointed out that the gas generator cannot only have one but multiple main chambers (second chambers). For instance, an ignition chamber (first chamber) is arranged to each of the main chambers. In a variant the gas generator has two ignition chambers which in each case are assigned to one main chamber.

In a further exemplary embodiment of the invention, the movable part has pre-determined breaking point, which breaks when the gas pressure in the chamber exceeds a determined value so that the movable part forms (releases) in the area of the pre-determined breaking point an outflow opening.

In a further exemplary embodiment the first chamber for receiving the propellant is restricted by a pipe at which first end an ignition device is arranged and which second end is in close contact to an elastic gas guiding plate that rests at least sectionally inside against the gas generator housing.

Due to the specific adjustment of the stiffness and elastic resilience of the gas guiding plate a good contact with the gas generator housing and therefore good advanced ignition properties are guaranteed. It is practical that for adjusting the stiffness and elastic resilience at least one circular bead is provided in the bottom of the gas guiding plate. Production and assembly tolerances in axial direction can be compensated by a corresponding contact length of the bead with the gas generator housing.

The close contact of the second end of the pipe with the gas guiding plate can be guaranteed in such that the gas guiding plate has a cup-shaped section into which the second end of the pipe engages whereby the second end rests closely against the side wall of the cup-shaped section without being connected to it by auxiliary means. The pipe rests preferably in the area of its first end with its inner wall in a pressed fit against a receptacle for an ignition device and in the area of its second end with its outer wall in press fit against a side wall of the cup-shaped section. The press fit on the receptacle of the ignition device and in the cup-shaped section differs preferably in its strength.

The bottom of the cup-shaped recess rests at least sectionally closely against the generator housing.

It is advisable that the generator housing and the gas guiding plate are deformable in the area of the second end of the pipe by the pressure generated after ignition of the propellant in the pipe such that a space between the first end of the pipe and the gas guiding plate and therefore a connection between the first and the second chamber is provided, or a space between the first end of the pipe and the ignition device and therefore a connection between the first and the second chamber is provided.

It can also be alternatively advisable that the gas generator housing is deformable on the side of the first end of the pipe or the ignition device by the pressure wave generated after ignition of the propellant in the pipe such that a space between the first end of the pipe and the ignition device and therefore a connection between the first and the second chamber is present or a space between the second end of the pipe and the gas guiding plate and therefore a connection between the first and the second chamber is present.

The hot gases generated by ignition of the propellant can flow through this space from the first into the second chamber in which the main gas set is located. Through this, breaches in the pipe can be omitted.

The pipe extends when using a cup-shaped gas generator preferably between the ignition device extending from the bottom of the gas generator into the same and the cover of the gas generator.

BRIEF DESCRIPTION OF THE DRAWINGS

The invention is explained in examples by the means of drawings.

DETAILED DESCRIPTION

Figure 1:
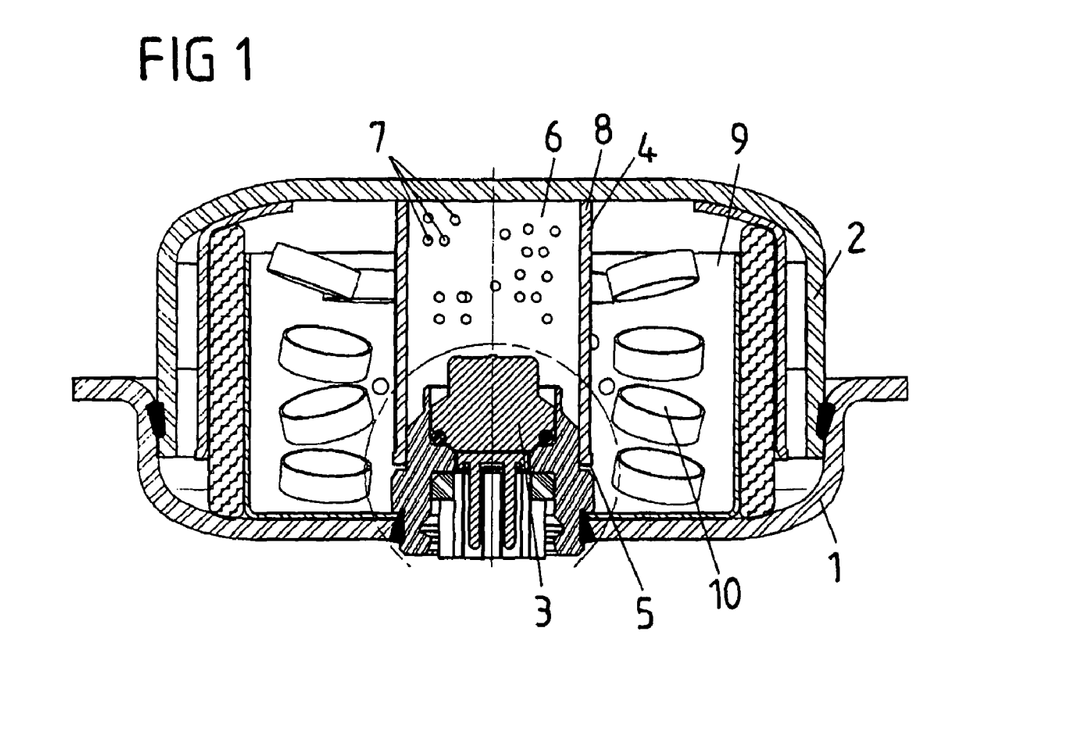
FIG. 1 shows a section through a first embodiment of a cup-shaped gas generator before ignition of the propellant.

The gas generator according to FIG. 1 has a bottom 1 and a cover 2, which form together the housing of the gas generator. An ignition device 3 projecting into the gas generator is connected with the bottom 1. A first end 5 of a pipe 4, which encloses a first chamber 6 for the receiving of a propellant 7, is connected with the ignition device 3. The connection between the pipe 4 and the ignition device corresponds to a known arrangement between a cup-shaped sleeve and the ignition device. The propellant 7 is present in form of pellets.

The second end 8 of the pipe 4 reaches up to the cover 2 and thereby seals the first chamber 6 upwardly and against a second chamber 9 for a main gas set 10, which is provided there in form of tablets. The sealing between the end 8 of the pipe 4 and the cover 2 does not have to be gas tight. In fact, these parts can be produced with the usual tolerances so that small gaps are present. It has only to be prevented that pellets of the propellant reach into the chamber 9 before its ignition.

Figure 2:
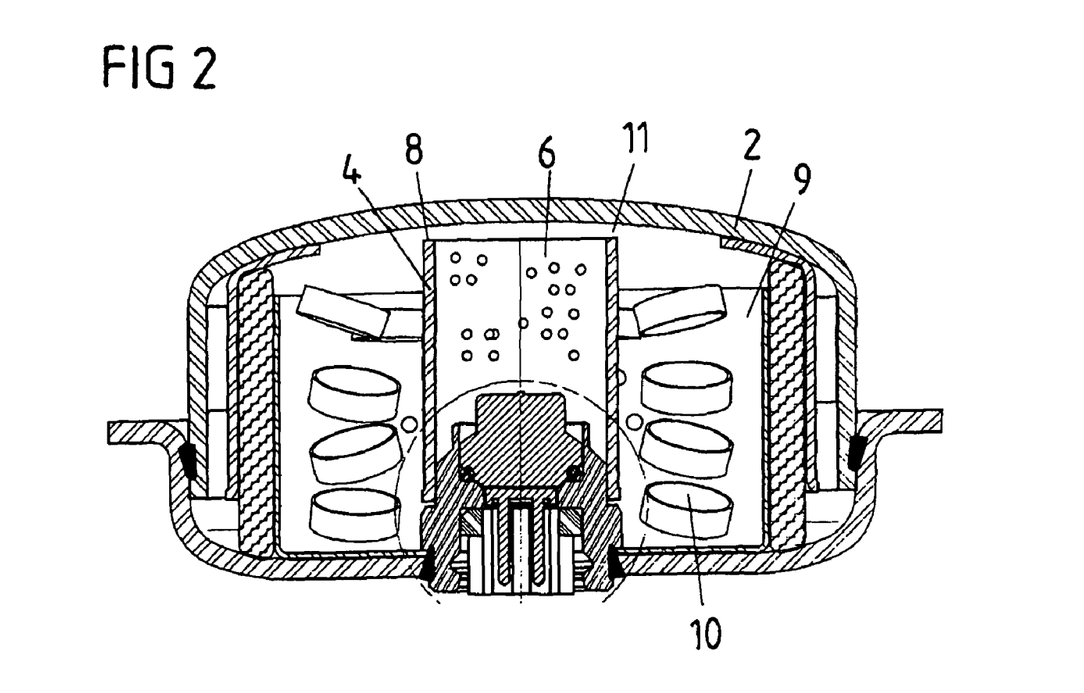
FIG. 2 shows a gas generator according to FIG. 1 after ignition of the propellant.

After ignition of the propellant 7 overpressure is built up inside the chamber 6 due to the gases generated thereby, which deforms the cover 2 of the generator housing outwardly as shown in FIG. 2. Thereby, a gap 11 is formed between the second end 8 of the pipe 4 and the cover 2 through which the hot gases flow from the chamber 6 into the chamber 9 in order to ignite the main gas set 10 there. This delivers the gases for the inflation of the airbag.

Due to the formed gap 11 breaches in pipe 4 are not required so that the production is simplified compared to a cup-shaped sleeve.

But also the production process of the gas generator is simplified by the use of pipe 4.

Figure 3:
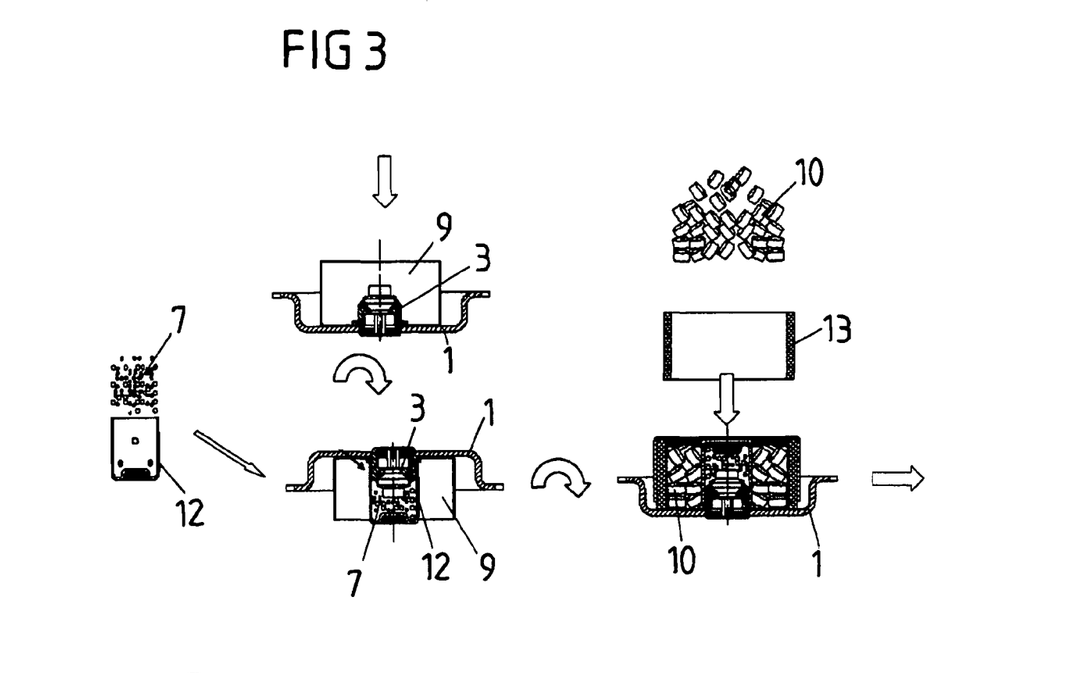
FIG. 3 shows schematically essential steps of the production process of a gas generator with a cup-shaped sleeve as container for the propellant.

As shown in FIG. 3 the gas generator has to be turned at least once during the production process. At first, a cup-shaped sleeve 12 was filled with the pellets of the propellant 7. Afterwards, the bottom 1 of the gas generator was placed on the sleeve 12 and connected to the ignition device 3. In order to insert the main gas set 10 from above into the chamber 9 the bottom 1 connected with the sleeve 12 had to be pivoted around 180°. In this position a filter ring 13 was additionally inserted.

Figure 4:
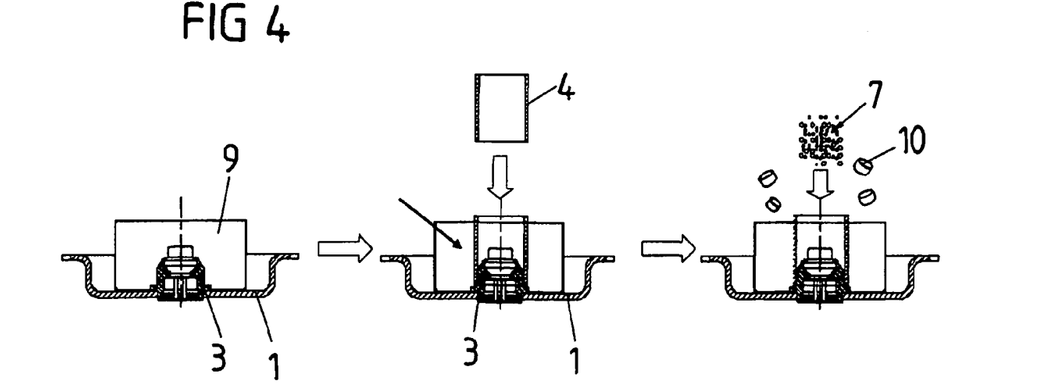
FIG. 4 shows schematically essential steps of the production process of the gas generator with a tube as container for the propellant.

By using the pipe 4 as a container for the propellant this production process is simplified as can be seen from FIG. 4. The pipe 4 is inserted into the bottom 1 pointing upwards with the opening to which the ignition device 3 as well as the casing of chamber 9 is fixed and is connected to the ignition device 3. Subsequently, the propellant 7 as well as the main gas set 10 can be inserted from above. The turning of the bottom 1 can therefore be omitted.

Figure 5:
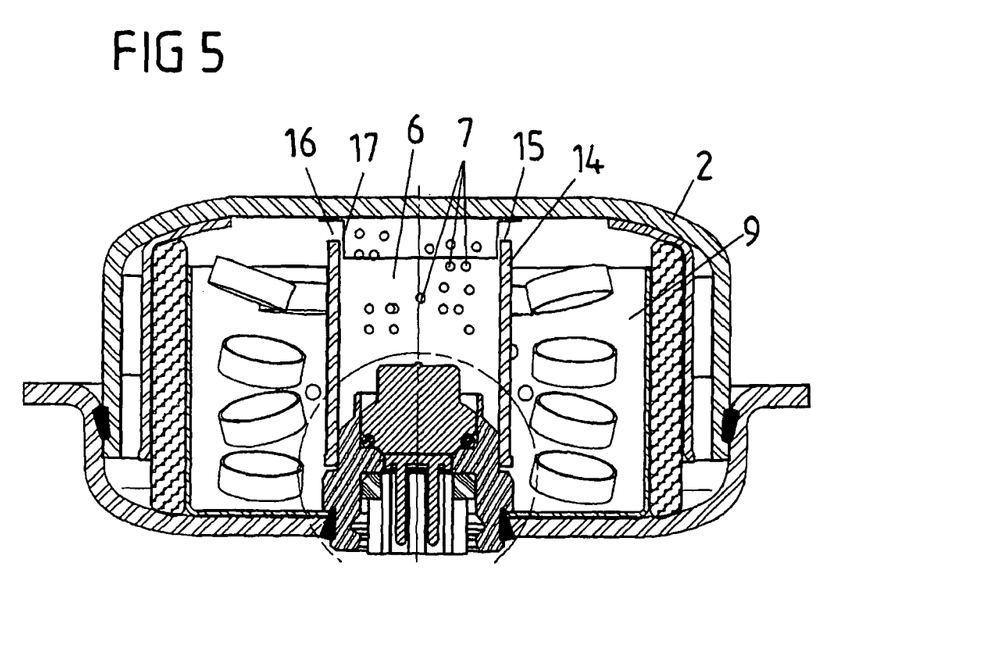
FIG. 5 shows a section through a second embodiment of the cup-shaped gas generator before ignition of the propellant.
Figure 6:
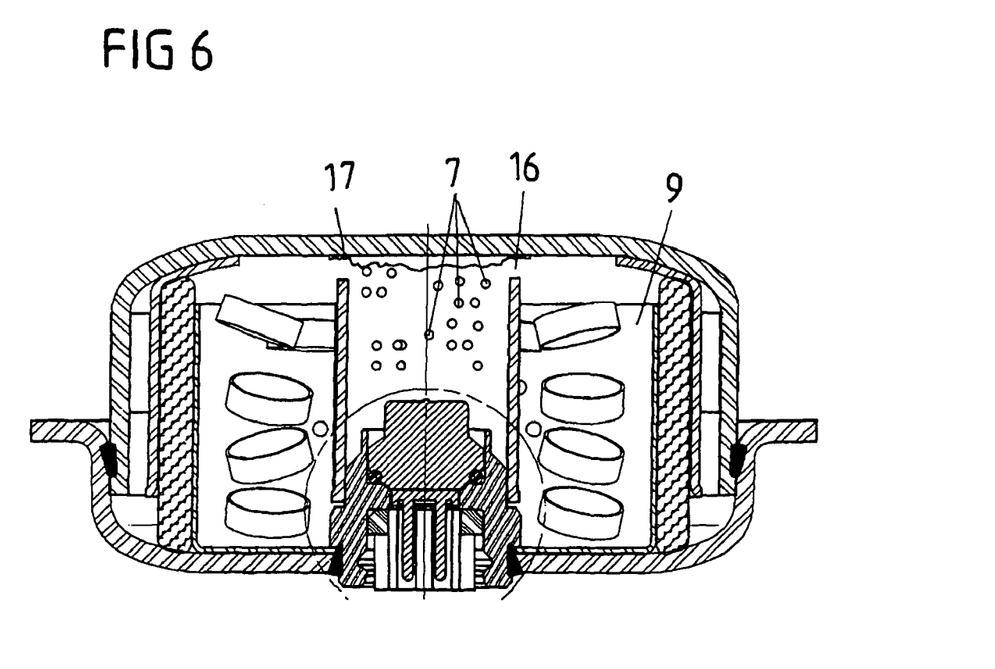
FIG. 6 shows the gas generator according to FIG. 5 after ignition of the propellant.

In the embodiment according to FIG. 5 a pipe 14, which is arranged instead of the pipe 4 of the first embodiment, does not reach with its second end 15 up to the cover 2. The gap 16 thus formed between this and the end 15 is in this case sealed with a film 17 so that before ignition of the gas generator the propellant 7 cannot reach into the chamber 9.

As a result of the overpressure generated after ignition of the propellant 7 in the chamber 6 the film 17 is destroyed so that now the hot gases of the propellant 7 can enter through the gap 16 into the chamber 9.

Also in this second embodiment the production process is simplified as shown in FIG. 4.

Figure 7:
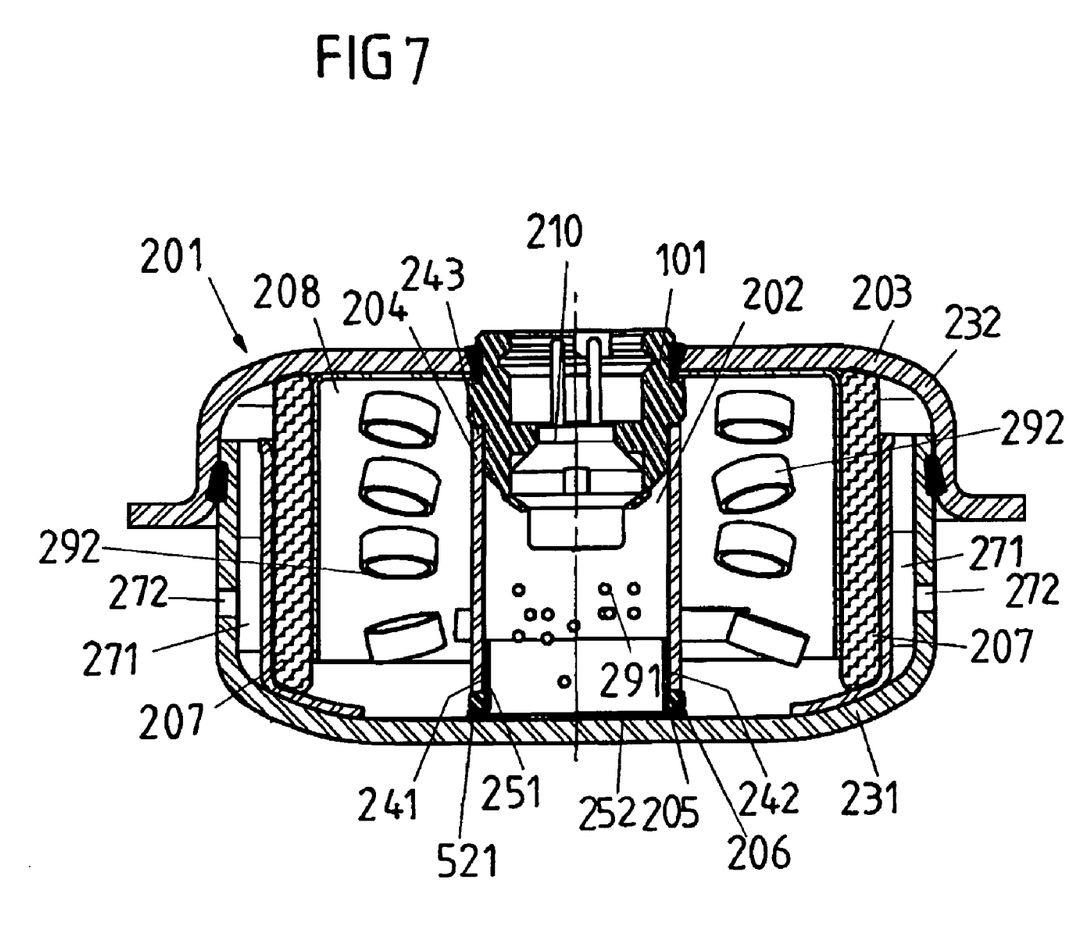
FIG. 7 shows a gas generator according to a further embodiment of the invention.

The gas generator 201 of FIG. 7 has a first chamber 202 which is surrounded by a housing 203 whereby the housing 203 is formed by a lower housing part 231 (cup) which is connected to an upper housing part 232 (base). Adjacent to the first chamber 202 a second chamber 208 is provided which surrounds the first chamber 202 in a circular manner. The first chamber 202 contains a first pyrotechnical load in form of an advanced ignition load 291 (for instance in form of pellets) which has a conventional booster load mixed with an advanced ignition means. The advanced ignition load 291 serves for the ignition of a second pyrotechnical load in form of a main gas set 292 of the second chamber 208. In turn, the gas set 292 serves the generation of gas with which an airbag (not shown) shall be inflated. The advanced ignition means contained in the advanced ignition load 291 is characterized by a lower ignition temperature compared to the main gas set 292, for instance approximately 160° C. while the main gas set has for instance an ignition temperature of approximately 260° C.

The chamber 202 is restricted by a pipe 4 (booster pipe) and towards the lower housing part 203 by a movable part in form of a sealing 205. More precisely, the tube-like first part 204 extends towards a housing inner surface of the lower housing part 231 so that an end 241 of the pipe 204 is arranged in the area of the inner surface of the housing.

The sealing 205 has a first section 251, which is formed hollow cylindrical and extends along an inner circumference of the pipe 204, and a second section 252, which covers an opening 242 in the end 241 of the first part 204 cap-like and is connected in one part to the first section 251.

The first section 251 is bent from the second cap-like section 252 such that an overhang 521 is formed which sticks out from the first section 251 and protrudes from the opening 242. Between the end 241 of the pipe 204 (more precisely between a side of an edge of the end 241 which faces the housing part 231) and the inner wall of the housing part 231*a* means for exerting a restoring force onto the sealing 205 in form of an elastic element is arranged. In the embodiment of FIG. 7 a plastic ring 206 forms the elastic element, which encloses an outer circumference of the first section 251 of the sealing 205.

The plastic ring 206 is elastically formed and arranged such that it keeps the sealing 205 in position relatively to the lower housing part 231 so that a side of the second section 251 rests against the inner surface of the housing part 231 and a gap between the first chamber (e.g. between the section 251) and the housing part 231 is avoided as far as possible.

The plastic ring 206 allows in particular that the formation of a gap between the chamber 202 and the housing part 231 is avoided, if the housing part 231 is connected (welded) to the upper housing part 232. Due to the restoring force exerting onto the sealing 205 it is achieved that it moves with the lower housing part 231, if this is pushed away by the upper housing part 232 through exertion of a force by elastic components inside of the gas generator, for instance by elastic filters 207 before welding.

Such a pushing apart of the housing parts 231, 232 can occur although between the sections of the two housing parts a frictional force is effective. The frictional force between the two housing parts can in particular be reduced during the welding of the two housing parts as a result of the temperature increase so that a pushing apart of the housing parts 231, 232 does not occur indeed before the welding but during the welding. Also, in this case the construction according to the invention avoids the formation of a gap between the first chamber 202 and the housing part 232 due to the movable sealing 205 and the elastic plastic element 206.

The gas generator 201 has for ignition of the advanced ignition load 291 in the first chamber 202 an ignition device 210 which is arranged on a receptacle 101. The receptacle 101 restricts a second end 243 of the pipe 204 which is opposite to the first end 241. The second end 243 is for instance mounted onto the receptacle 101 by press fit.

This has the consequence that by impact of a high temperature onto the gas generator the advanced ignition load 291 is ignited premature which leads to a premature ignition of the main gas set 292. The premature ignition effects a controlled burning whereby an excessive inner pressure is avoided in particular in the second chamber 208.

In order to ignite the main gas set 292 gas from the first chamber 202 has to reach the second chamber 208. For this reason the part 205 has a predetermined breaking point which breaks by the impact of a pressure in the first chamber 202 and releases an outflow opening over which gas from the first chamber 202 can flow into the second chamber 208. This is shown in FIG. 8.

It is pointed out that the invention is of course not restricted to gas chambers with two chambers. It extends also for instance to gas generators which have only one chamber, e.g. working without a separate advanced ignition load. Furthermore, a gas generator according to the invention can have for instance two first chambers with an advanced ignition load in each case and two further chambers containing a main gas set.

Figure 8:
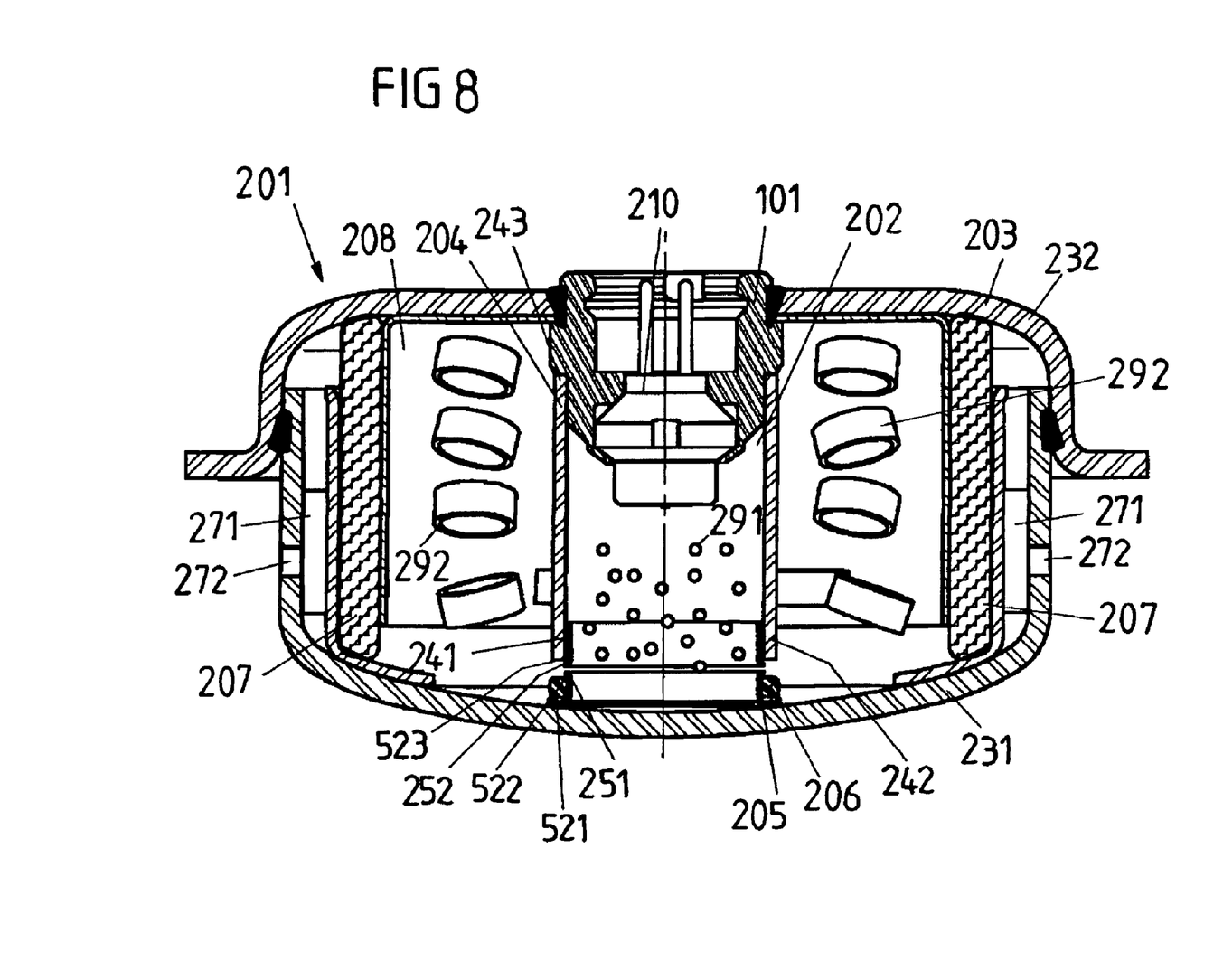
FIG. 8 shows the gas generator according to FIG. 7 after ignition.

FIG. 8 relates to the situation that an ignition of the advanced ignition load 291 occurs after the impact of outside heat. The ignited advanced ignition load 291 releases gas whereby the gas pressure generated in the chamber 202 bends the lower housing part 231 away from pipe 204 and the part 205 is moved away from the pipe 204 (downwards) by the inner pressure existing in the chamber 202.

Through this, the portion of the hollow cylindrical first section 251 of the sealing 205, which does not extend into the pipe 204, is elongated. In this portion of the first section 251*a* pre-determined breaking point 522 is provided, which breaks when the inner pressure in the first chamber 202 exceeds a certain value whereby the breaking of the pre-determined breaking point 522 releases an opening 523, which is formed by a passage between the end 241 of the pipe 204 and the plastic ring 206 and by an opening in the section 251 in the area of the broken pre-determined breaking point 522. Gas can flow via the opening 523 from the first chamber 202 into the second 208 in order to ignite the main gas set 292 there. The gas generated by the ignited main gas set 292 in the second chamber 208 flows via the filter 207 and spaces 271 respectively through an outflow opening 272 into an airbag (not shown).

Figure 9:
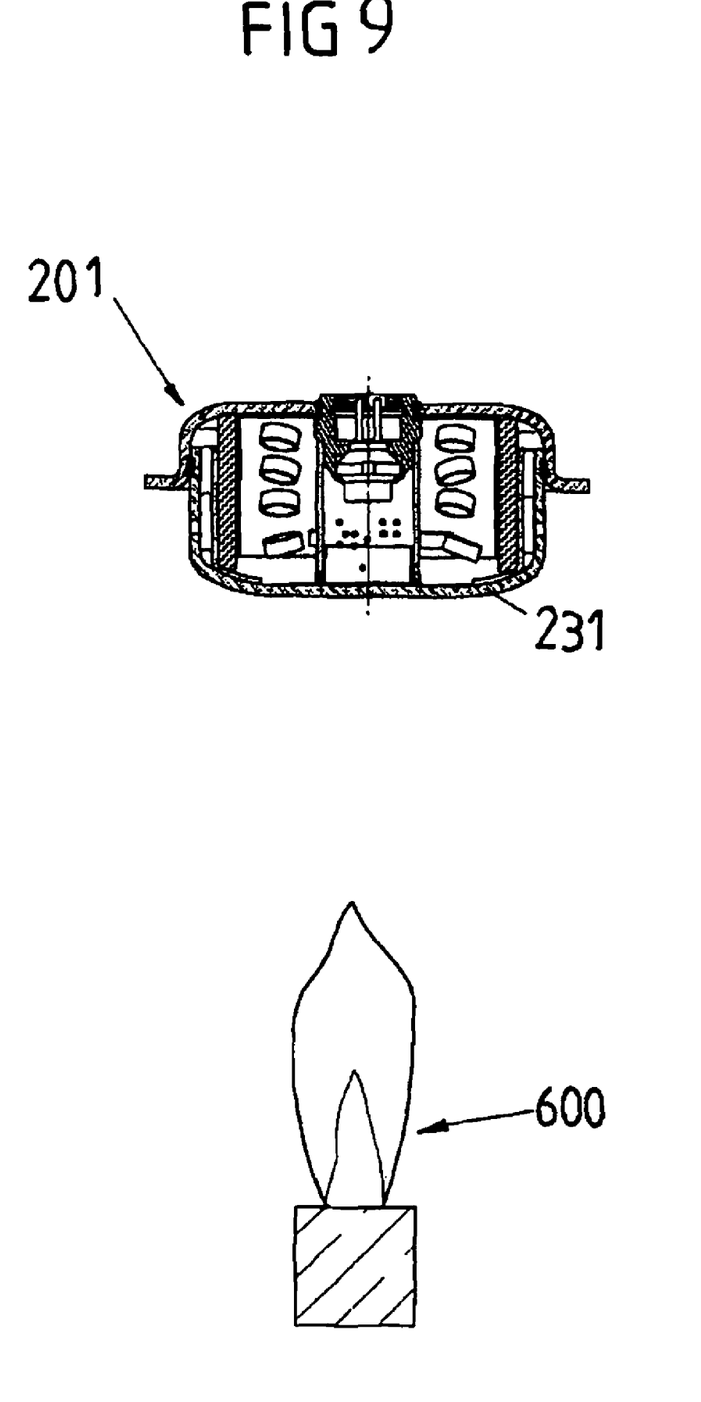
FIG. 9 shows a gas generator of FIG. 7 during a bonfire test.

FIG. 9 illustrates the position of a gas generator according to the invention in a variant of the so called bonfire test for examining the heat resistance of the gas generator, namely the so called position of the gas generator "from fire". In this position an outside heat of a heat source 600 affects mainly the lower housing part 231 of the gas generator 201.

Figure 10:
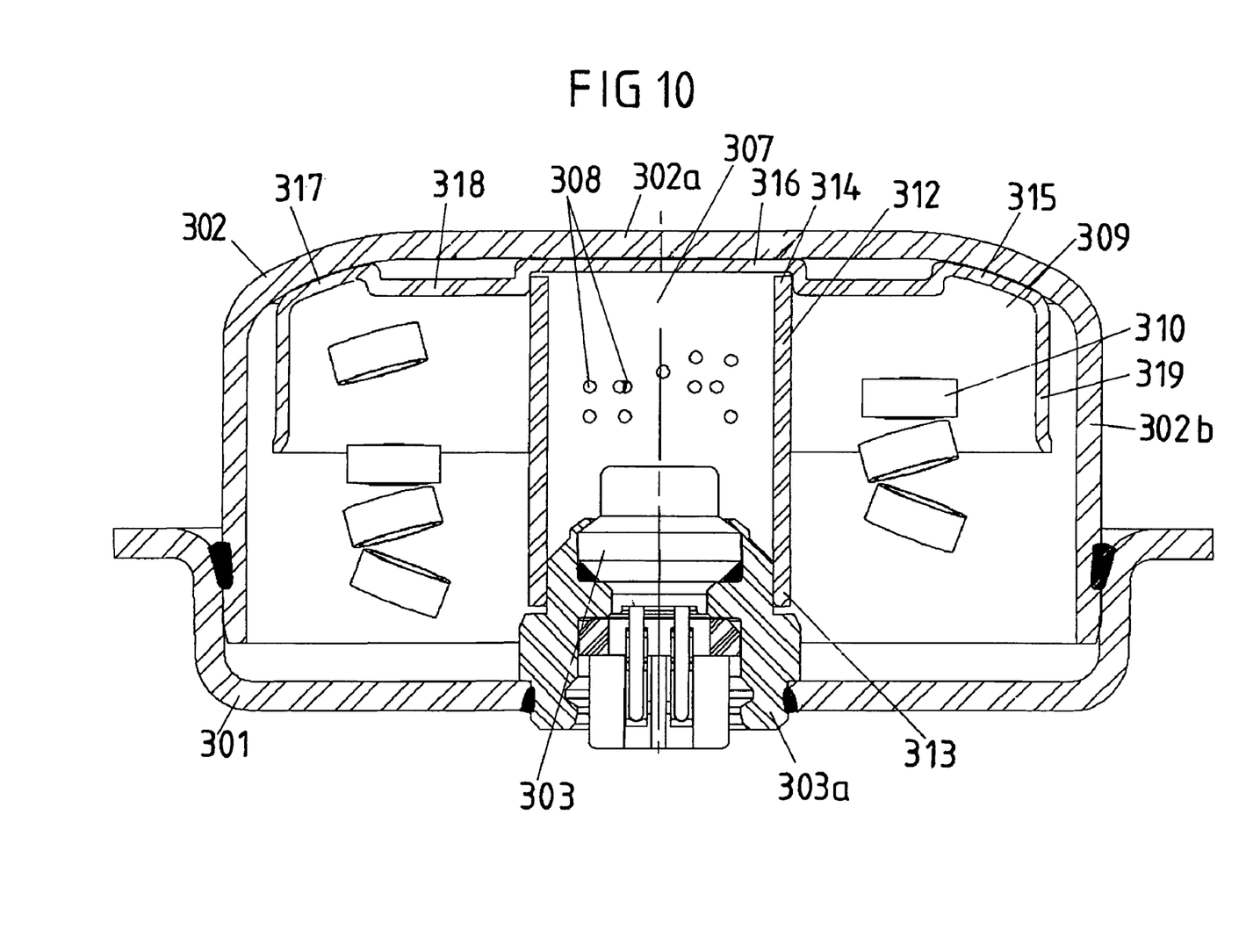
FIG. 10 shows a section through a cup-shaped gas generator according to the invention before ignition of the propellant.

The gas generator shown in FIG. 10 has a bottom 301 and a cap 302. Furthermore, an ignition device 303 and a receptacle for the ignition device 303*a* are provided which both extend into the gas generator. A first end 313 of the pipe 312 is connected by press fit to the receptacle of the ignition device 303a. The pipe 312 encloses the first chamber 307 for receiving the propellant 308. The propellant 308 is present in form of pellets. In the area of the cap shaped elements can be arranged in the chamber 307. Here, it is dealt with specific fuels which due to their characteristics guarantee an ignition at low temperatures. These shaped elements are not shown in the Figures.

In the gas generator an elastic deformable gas guiding plate 315 is arranged which has a cup-shaped section 316 which rests inside against the cap 302. Furthermore, a circular section 317 is present which can also rest inside against the cap 302. A circular bead 318 extends between the sections 316 and 317. This bead supports the elasticity of the gas guiding plate 315 in the upper area 302a of the cap 302 and therefore a tight rest of the section 316 against the upper area 302a.

Due to the specific adjustment of stiffness and elastic resilience of the gas guiding plate 315 by the bead 318 a good contact to the cap 302 of the generator housing and therefore a good advanced ignition property is guaranteed. Furthermore, geometrical tolerances of the single components as well as such resulting during assembly are compensated due to the elastic resilience of the gas guiding plate.

The second end 314 of the pipe 312 extends into the cup-shaped section 316 and is connected to it by press fit so that a mixing of the propellant 308 from the first chamber 307 with the main gas set 310 in the second chamber 309 is suppressed. Additionally, a good thermal conductivity between the pipe 312 and the gas guiding plate 315 is provided. A lateral section 319 of the gas guiding plate 315 continues in a distance to side wall 302b of the cap 302.

Figure 11A:
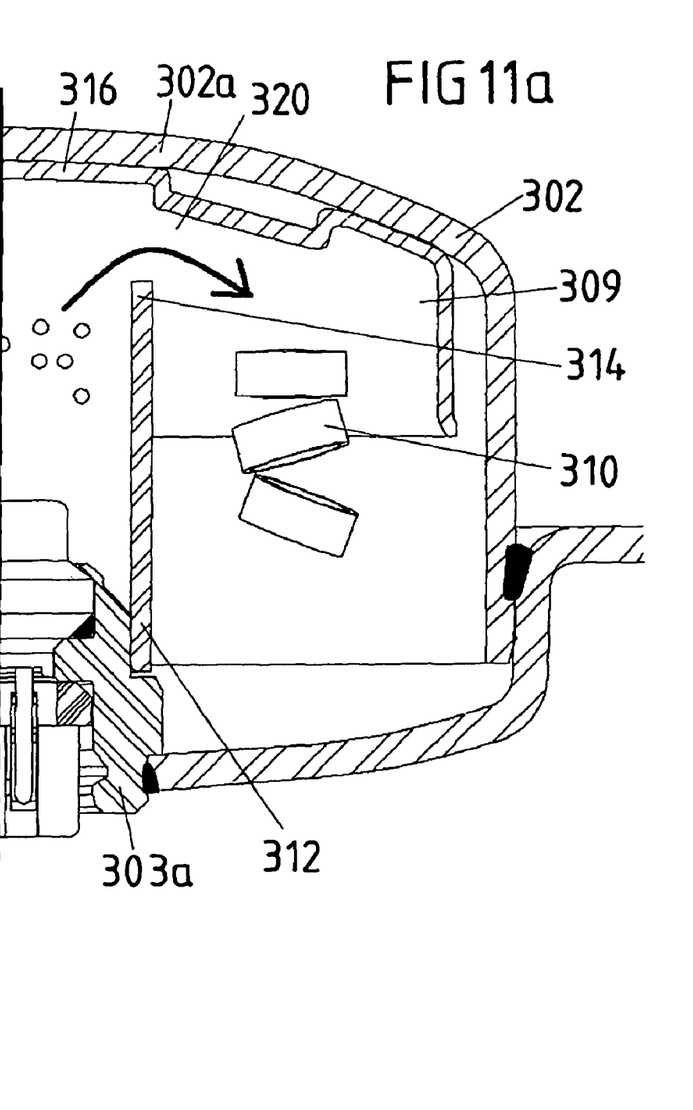
FIG. 11a shows a half of the gas generator according to FIG. 10 after ignition of the propellant.
Figure 11B:
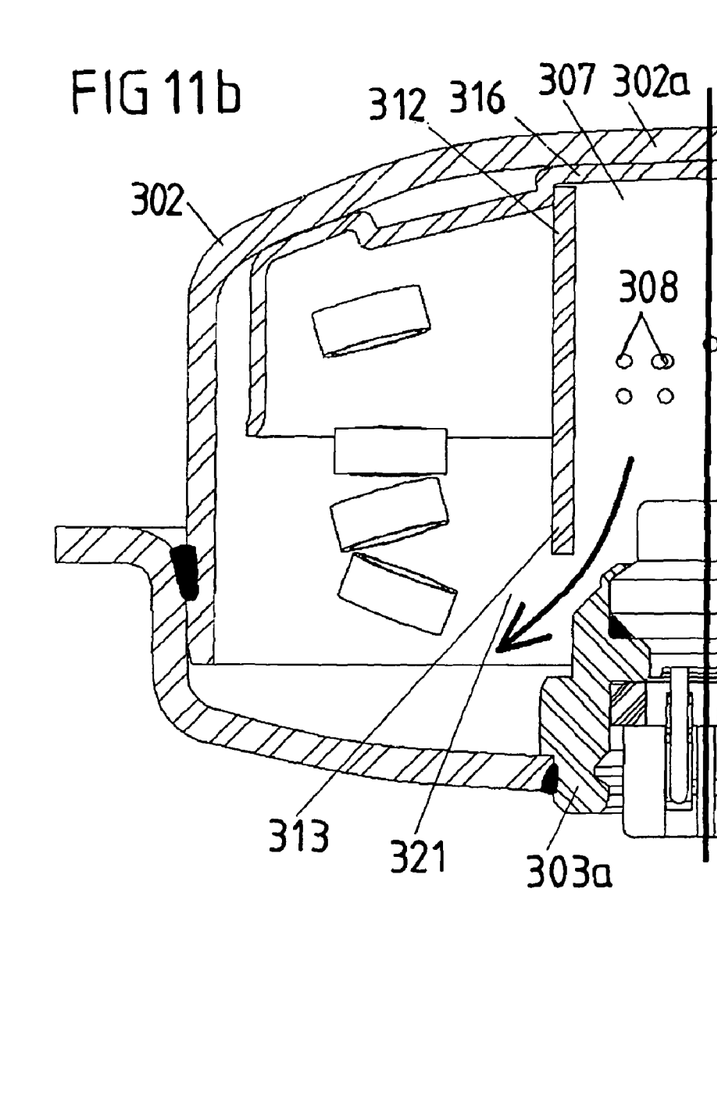
FIG. 11b shows a half of the gas generator according to FIG. 10 after ignition of the propellant.

In FIG. 10 the gas generator is shown before ignition of the propellant 308. The FIGS. 11a and 11b show the gas generator after ignition of the propellant 308. It is recognizable that the cup-shaped section 316 and the upper area 302a of the cap 302 is buckled due to the pressure generated after ignition of the propellant 308 in the first chamber 307. Through this, two embodiments result for connecting the first chamber 307 with the second chamber 309.

The first possibility is shown in FIG. 11a. In the embodiment of FIG. 11a the press fit between the pipe 312 and the receptacle for the ignition device 303a is stronger than between the pipe 312 and the side wall of the cup-shaped section 316. Through this it is guaranteed that the pipe 312 is only released on its second end 314 from its fixing so that a space 320 between the second end 314 and the cup-shaped section 316 is formed through which the gas generated in the first chamber 307 can flow into the second chamber 309 in order to ignite the main gas set 310.

The second embodiment is shown in FIG. 11b. In the embodiment of FIG. 11b the press fit between the pipe 312 and the side wall of the cup-shaped section 316 is stronger than the press fit between the pipe 312 and the receptacle for the ignition device 303a. Through this, it is guaranteed that the pipe 312 is released only at its first end 313 from the receptacle for the ignition device 303a. Thus, a space 321 between the first end 313 and the receptacle for the ignition device 303a is generated through which the gas generated in the first chamber 307 flows into the second chamber 309 in order to ignite the main gas set 310.

Alternatively, the gas generator housing can be deformable on the side of the first pipe end 313 or the ignition device 303 by the pressure wave generated after the ignition of the propellant 308 in the pipe such that the space between the first end 313 of the pipe 312 and the ignition device 303 and therefore the connection between the first and the second chamber 307 or 309 is formed or that the space between the second end 314 of the pipe 312 and the cup-shaped section 316 and therefore the connection between the first and the second chamber 307 or 309 is formed. Although this alternative deformation is not shown in the FIGS. 11a and 11b, spaces are generated there corresponding to the spaces 320 and 321.

The priority applications, German Patent Application 10 2007 048 735.7, filed Oct. 5, 2007, German Application 10 2007 060 451.5, filed Dec. 12, 2007, and German Application 10 2008 019 863.3, filed Apr. 16, 2008, including the specifications, drawings, claims and abstracts, are incorporated herein by reference in their entireties.

What is claimed is:

1. A gas generator for an airbag module, comprising:
a gas generator housing having a first chamber and a second chamber;
a propellant arranged in the first chamber;
a main gas generating material arranged in the second chamber, the propellant in the first chamber configured to ignite the main gas generating material in the second chamber; and
an ignition device for ignition of the propellant,
wherein the first chamber for receiving the propellant is restricted by a pipe, on a first end of which the ignition device is arranged,
wherein a second end of the pipe reaches the gas generator housing such that, before the ignition of the propellant, the second end of the pipe rests directly against the gas generator housing or that, before the ignition of the propellant, between the second end of the pipe and the gas generator housing a gap is present caused by production tolerances so small that no products of the propellant can reach the second chamber via the second end of the pipe, and
wherein the second end of the pipe reaches the gas generator housing such that the gas generator housing is deformable by pressure generated after the ignition of the propellant in the pipe and the pipe is arranged in such a way that an intermediate space is generated between the second end of the pipe and the gas generator housing so that hot gases generated by the ignition of the propellant can flow through the intermediate space between the second end of the pipe and the gas generator housing from the first chamber into the second chamber containing the main gas generating material.

2. The gas generator according to claim 1, wherein the gas generator is cup-shaped such that the pipe extends between the ignition device extending from a bottom of the gas generator to a cover of the gas generator.

3. The gas generator according to claim 1, wherein a pyrotechnical load is provided in the first chamber,
wherein the gas generator housing at least partially encloses the first chamber,
wherein the pipe restricts a section of the first chamber,
wherein a movable part movable relatively to the pipe is provided, which restricts the first chamber towards a portion of the gas generator housing,
wherein means for exerting a restoring force on the movable part is provided in order to keep the movable part in thermal contact with the gas generator housing such that the first chamber is in thermal contact with the gas generator housing via the movable part, and
wherein the means for exerting a restoring force preloads the movable part against the gas generator housing.

4. The gas generator according to claim 3, wherein the movable part at least partially covers an opening formed in the second end of the pipe, and wherein the movable part is formed flange-like such that a first section of the movable part extends along an inner circumference of the pipe and a second section of the movable part at least partially covers the opening.

5. The gas generator according to claim 4, wherein one side of the second section of the movable part rests against an inner surface of the gas generator housing.

6. The gas generator according to claim 4, wherein the second section of the movable part projects with one overhang over the opening.

7. The gas generator according to claim 3, wherein the means for exerting a restoring force comprises an elastic element or a spring-like element.

8. The gas generator according to claim 3, wherein the means for exerting a restoring force has an elastic element which is arranged between the second end of the pipe and an inner surface of the gas generator housing and which is temperature-resistant up to a temperature which is above an ignition temperature of the pyrotechnical load.

9. The gas generator according to claim 8, wherein the elastic element is arranged between the second end of the pipe and an overhang of the movable part.

10. The gas generator according to claim 3, wherein the means for exerting a restoring force has an elastic element, which simultaneously seals the first chamber against the second chamber.

11. The gas generator according to claim 3, wherein the movable part releases, under an impact of a gas pressure in the first chamber generated by igniting the pyrotechnical load, an outflow opening through which the gas can flow out of the first chamber, and wherein the gas can flow out of the first chamber via the outflow opening into the second chamber.

12. The gas generator according to claim 3, wherein the movable part has a pre-determined breaking point, which breaks when the pressure in the first chamber exceeds a certain value so that the movable part releases an outflow opening in an area of the pre-determined breaking point.

13. The gas generator according to claim 1, wherein the second end of the pipe is in close contact to an elastic gas guiding plate, which at least sectionally rests on an inside of the gas generator housing.

14. The gas generator according to claim 13, wherein the gas guiding plate has a cup-shaped section, into which the second end of the pipe projects such that the second end of the pipe rests closely against a side wall of the cup-shaped section without being connected to the side wall of the cup-shaped section via auxiliary means.

15. The gas generator according to claim 14, wherein, in an area of the first end of the pipe, an inner wall of the pipe is pressed fit against a receptacle for the ignition device, and wherein, in an area of the second end of the pipe, an outer wall of the pipe is pressed fit against the side wall of the cup-shaped section.

16. The gas generator according to claim 13, wherein the generator housing and the gas guiding plate are deformable in an area of the second end of the pipe by the pressure generated after ignition of the propellant in the pipe such that:
 (i) a space is present between the second end of the pipe and the gas guiding plate and therefore a connection between the first chamber and the second chamber is present; or
 (ii) a space is present between the first end of the pipe and the ignition device and therefore a connection between the first chamber and the second chamber is present.

17. The gas generator according to claim 13, wherein the gas generator housing is deformable on a side of the first end of the pipe or the ignition device by a pressure wave generated after the ignition of the propellant in the pipe such that:
 (i) a space between the first end of the pipe and the ignition device and therefore a connection between the first chamber and the second chamber is present, or
 (ii) a space between the second end of the pipe and the gas guiding plate and therefore a connection between the first chamber and the second chamber is present.

18. The gas generator according to claim 13, wherein at least one circular bead is provided in a bottom of the gas guiding plate for adjusting stiffness and elastic resilience of the gas guiding plate.

19. A vehicle occupant restraining system, comprising:
 an airbag module comprising a gas generator according to claim 1.

* * * * *